(12) United States Patent
Satran et al.

(10) Patent No.: US 7,682,108 B2
(45) Date of Patent: Mar. 23, 2010

(54) CUTTING INSERT ADJUSTMENT DEVICE

(75) Inventors: Amir Satran, Kfar Vradim (IL);
Alexander Koifman, Shlomi (IL);
Alexander Bronshteyn, Nahariya (IL)

(73) Assignee: Iscar, Ltd., Tefen (IL)

( * ) Notice: Subject to any disclaimer, the term of this patent is extended or adjusted under 35 U.S.C. 154(b) by 272 days.

(21) Appl. No.: 11/832,335

(22) Filed: Aug. 1, 2007

(65) Prior Publication Data
US 2008/0044240 A1 Feb. 21, 2008

(30) Foreign Application Priority Data
Aug. 21, 2006 (IL) ..................................... 177613

(51) Int. Cl.
*B26D 1/00* (2006.01)
(52) U.S. Cl. ............................. 407/87; 407/36; 407/40; 407/44
(58) Field of Classification Search .................. 407/34, 407/40, 46, 49, 36, 37, 38, 39, 44, 45, 85, 407/86, 87
See application file for complete search history.

(56) References Cited

U.S. PATENT DOCUMENTS

| | | | | | |
|---|---|---|---|---|---|
| 3,116,538 | A | * | 1/1964 | Severson | 407/41 |
| 3,217,384 | A | * | 11/1965 | Wirfelt | 407/36 |
| 3,839,772 | A | * | 10/1974 | Shimomura et al. | 407/36 |
| 3,847,555 | A | * | 11/1974 | Pegler et al. | 407/36 |
| 4,311,418 | A | * | 1/1982 | Erkfritz et al. | 407/39 |
| 4,318,647 | A | * | 3/1982 | Erkfritz | 408/153 |
| 4,329,091 | A | * | 5/1982 | Erkfritz | 407/41 |
| 4,474,512 | A | * | 10/1984 | Lindlar et al. | 407/39 |
| 4,533,281 | A | * | 8/1985 | Lacey | 407/36 |
| 4,848,977 | A | * | 7/1989 | Kieninger | 407/39 |
| 5,102,269 | A | * | 4/1992 | Arai et al. | 407/41 |
| 5,147,157 | A | * | 9/1992 | Pawlik | 407/36 |

(Continued)

FOREIGN PATENT DOCUMENTS

DE 3936243 5/1991

(Continued)

OTHER PUBLICATIONS

International Search Report, PCT/IL2007/000948, dated Dec. 6, 2007.

*Primary Examiner*—Jason Daniel Prone
*Assistant Examiner*—Jennifer Swinney
(74) *Attorney, Agent, or Firm*—Womble Carlyle

(57) ABSTRACT

The disclosure provides a device for adjusting a position of a cutting insert, the device may include an adjustment screw, an adjustment wedge adapted to receive the screw, wherein a position of the wedge is a function of the rotation of the screw and a partially flexible intermediate member between a surface of the wedge and a surface of the cutting insert, wherein the intermediate member is supported on both ends. The disclosure further provides a cutting tool adapted to receive at least one device for adjusting a position of a cutting insert, wherein the device may include an adjustment screw, an adjustment wedge adapted to receive the screw, wherein a position of the wedge is a function of the rotation of the screw and a partially flexible intermediate member between a surface of the wedge and a surface of the cutting insert, wherein the intermediate member is supported on both ends.

27 Claims, 10 Drawing Sheets

U.S. PATENT DOCUMENTS

| | | | |
|---|---|---|---|
| 5,156,501 A * | 10/1992 | Pawlik et al. | 407/36 |
| 5,209,610 A * | 5/1993 | Arai et al. | 407/36 |
| 5,863,156 A * | 1/1999 | Satran et al. | 407/36 |
| 6,655,879 B2 * | 12/2003 | Grehn | 407/44 |
| 7,002,085 B2 * | 2/2006 | Ullmann et al. | 200/5 R |
| 7,014,393 B2 * | 3/2006 | Matheis | 407/37 |
| 7,114,890 B2 * | 10/2006 | Noggle | 407/36 |
| 2006/0283898 A1 * | 12/2006 | Tages | 224/269 |
| 2007/0251771 A1 * | 11/2007 | Huang | 188/73.1 |

FOREIGN PATENT DOCUMENTS

| | | |
|---|---|---|
| JP | 2000005919 | 1/2000 |
| JP | 2000005919 A * | 1/2000 |

\* cited by examiner

CUTTING INSERT ADJUSTMENT DEVICE

FIELD OF THE INVENTION

The present invention relates generally to the field of cutting tools. More specifically the present invention relates to cutting insert adjustment device(s) and tool(s) adapted to receive cutting insert adjustment device(s).

BACKGROUND OF THE INVENTION

A common problem in cutting tools is the necessity to make fine adjustments in the position of cutting inserts. Contributing factors may include uneven wear resulting from repeated use, and variations in cutting insert dimensions including those due to manufacturing tolerances. As a result, the use of devices for adjusting the position of a cutting insert in cutting tools, such as a milling cutter, has developed into a well established practice in the field.

The operating cutting tool environment may expose the cutting insert adjustment devices to incessant and repeated shock and vibration. This may cause the adjustment screws used in the adjustment devices to loosen slightly, and may contribute to misalignment in the position of the cutting insert or in other precision elements used therein to position the insert. The operating environment may also cause wear both in the precision elements in contact with the cutting insert, and in the insert itself, thereby also resulting in positional misalignment and undesirable wear characteristics for the insert and/or its supporting tool(s).

Therefore, despite the availability of numerous devices in the market, there is a great need for a cutting insert adjustment device which can handle the high working stresses associated with the operating environment of a cutting tool.

SUMMARY OF THE INVENTION

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other advantages or improvements.

In one embodiment, there is provided a device for adjusting a position of a cutting insert, the device may include an adjustment screw, an adjustment wedge adapted to receive the screw, wherein a position of the wedge is a function of the rotation of the screw and a partially flexible intermediate member between a surface of the wedge and a surface of the cutting insert, wherein the intermediate member is supported on both ends.

In another embodiment, there is provided a cutting tool adapted to receive at least one device for adjusting a position of a cutting insert, wherein the device may include an adjustment screw, an adjustment wedge adapted to receive the screw, wherein a position of the wedge is a function of the rotation of the screw and a partially flexible intermediate member between a surface of the wedge and a surface of the cutting insert, wherein the intermediate member is supported on both ends.

In another embodiment, there is provided a method of adjusting the position of a cutting insert in a cutting tool, the method may include initially securing a cutting insert to a cutting tool, adjusting the position of the cutting insert by rotating an adjustment screw located in an adjustment wedge, wherein the wedge applies an axial force on a flexible intermediate member which transmits the force applied by the wedge in the axial direction to the cutting insert and clamping the cutting insert.

In addition to the exemplary aspects and embodiments described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein be considered illustrative, rather than restrictive. The disclosure, however, both as to organization and method of operation, together with objects, features, and advantages thereof, may best be understood by reference to the following detailed description when read with the accompanying figures, in which.

Figure 1:
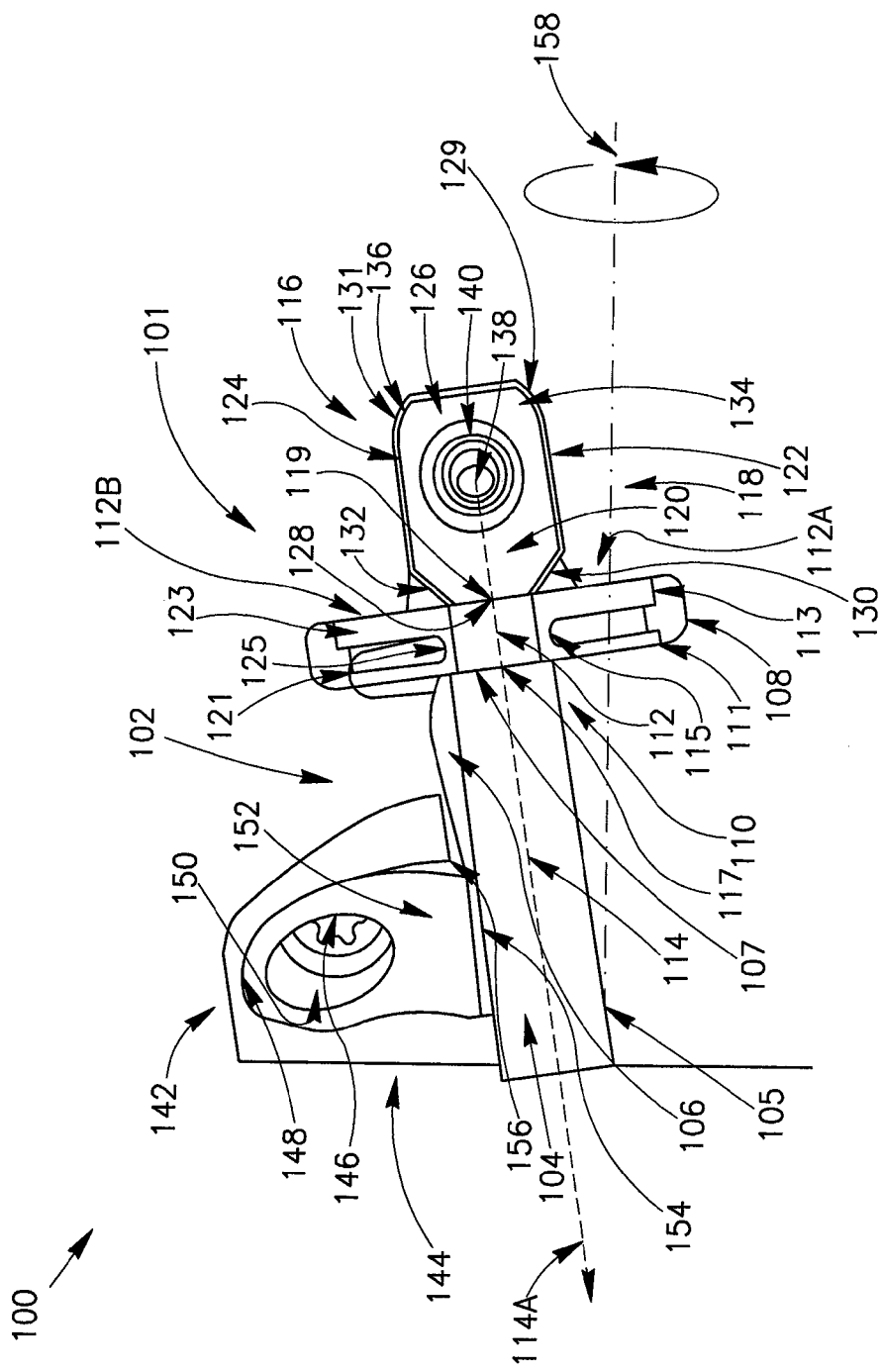
FIG. 1 shows a partial sectional view of a cutting tool body including a cutting insert adjustment device.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF THE INVENTION

In the following detailed description of the invention numerous specific details have been set forth in order to provide a thorough understanding of the disclosure. However, it will be understood by those skilled in the art that the preferred embodiment described herein may be practiced without these details and therefore it is not intended to limit the disclosure to the precise form disclosed.

The numbering system employed herein is based on assigning every part or element a three digit number. The first digit relates the part or element to the figure in which it is called out. The other two digits are the specific identifier of the part or element. It will be repeatedly encountered throughout this detailed description that similar, or even the same, parts or elements will appear in different figures. These parts or elements may be identified through the same specific identifier, that is, the last two digits in the assigned part number are the same.

In one embodiment, there is provided a device for adjusting a position of a cutting insert, the device may include an adjustment screw, an adjustment wedge adapted to receive the screw, wherein a position of the wedge is a function of the rotation of the screw and a partially flexible intermediate member between a surface of the wedge and a surface of the cutting insert, wherein the intermediate member is supported on both ends.

In another embodiment, there is provided a cutting tool adapted to receive at least one device for adjusting a position of a cutting insert, wherein the device may include an adjustment screw, an adjustment wedge adapted to receive the screw, wherein a position of the wedge is a function of the rotation of the screw and a partially flexible intermediate member between a surface of the wedge and a surface of the cutting insert, wherein the intermediate member is supported on both ends.

In another embodiment, there is provided a method of adjusting the position of a cutting insert in a cutting tool, the method may include initially securing a cutting insert to a cutting tool, adjusting the position of the cutting insert by rotating an adjustment screw located in an adjustment wedge, wherein the wedge applies an axial force on a flexible intermediate member which transmits the force applied by the wedge in the axial direction to the cutting insert and clamping the cutting insert.

According to some embodiments, the flexible intermediate member may include a leaf spring. The leaf spring may include two essentially parallel leaves connected to each other by a by a mid-section. One of the two essentially parallel leaves is thicker than the other. The flexible intermediate member may be adapted to transmit force applied by the wedge in the axial direction thereby to adjust the location and/or the position of the insert.

According to some embodiments, the adjustment wedge may include a top side and an essentially parallel bottom side, each comprising a trapezoidal surface. The adjustment wedge may further include a forward side wherein the forward side is disposed at an acute angle with respect to the top side. The forward side may be disposed at an obtuse angle with respect to the bottom side. The direction of advancing of the screw may be essentially parallel to the direction of advancing of the adjustment wedge.

According to some embodiments, the device may further include a clamping wedge, which may be adapted to secure the cutting insert to a cutting tool. The clamping wedge may be adapted to receive a clamping screw, which may be adapted to control the position of the cutting insert. The clamping wedge may be located essentially perpendicularly to the cutting insert.

Reference is made to FIG. 1, which shows a partial view of the cutting tool (100), and a possible mounting configuration for the cutting insert adjustment device (101), within the cutting tool body (102). The adjustment device (101) may include an adjustment wedge (118), which may be adapted to receive an adjustment screw (138), and a partially flexible intermediate member which may be a leaf spring (110). A cutting insert (104) is positioned inside an insert pocket (106) within the cutting tool body (102), such that the insert side (105) may be at an approximate angle, such as ranging from 5-15 degrees, for example 8 degrees, with respect to the axis of rotation (158) of the cutting tool (100). A portion of an insert side face (107), of the cutting insert (104), abuts with a portion of the outer wall (117) of the spring mid-section (112), of the leaf spring (110). As a consequence of this abutment, the possible action of an adjustment wedge (118), on the inner wall (119) of the leaf spring (110), may be translated into a displacement in an axial direction (114A), in a line parallel to the plane of insert side (105) and away from the cutting tool body (102), of the cutting insert (104).

The leaf spring (110) may have essentially a cross-sectional form of the letter "H". The right extension (112A) (or right end) of the leaf spring (110), may be formed by the parallel alignment of a right thin leaf (111) and a right thick leaf (113) connected through the spring mid-section (112). The left extension (112B) (or left end) of the leaf spring (110), is essentially symmetrical to the right section extension (112A), along the leaf spring line of symmetry (114). The left extension (112B) may include a left thin leaf (121) and a left thick leaf (123). The leaf spring (110) may possibly, although not necessarily, be fitted under pressure into a leaf spring pocket (108), within the cutting tool body (102), for example, by pressing right thin leaf (111) and right thick leaf (113) together, and left thin leaf (121) and left thick leaf (123) together, respectively, prior to insertion into the leaf spring pocket (108). The leaf spring (110) may thus be structurally supported and/or secured at one or both ends (112A, 112B). Additionally, the leaf spring (108) may be asymmetric (not shown) in cross section. Possibility or likelihood of fracture in the leaf spring (110) may be reduced by forming a right leaf rounded corner (115) at the connection of the right thin leaf (111) and right thick leaf (113) to the spring mid-section (112) of the leaf spring (110). Similarly, forming a left leaf rounded corner (125) at the connection of the left thin leaf (121) and left thick leaf (123) to the spring mid-section (112) of the leaf spring (110).

The adjustment wedge (118), may be a rectangularly shaped body with an eccentric threaded bore (140), and may be adapted to receive an adjustment screw (138), which may be inserted from the top side (120). The right side (122), left side (124), and the rear side (126), of the adjustment wedge, (118) may abut the walls of the adjustment wedge pocket (116), hereinafter referred to as AWP (116), within the cutting tool body (102), when the adjustment wedge (118) is inserted into the AWP (116). The forward side (128) of the adjustment wedge (118), may abut the inner wall (119) of the leaf spring (110), and in operation, exert a force in an axial direction (114A), which may be transmitted through the outer wall (117) of the leaf spring (110), to the cutting insert (104), when the adjustment wedge (118) is driven into or placed within the AWP (116). The intersection of the forward side (128) with the right side (122) of the adjustment wedge (118), may be a 90 degree (not shown) or non-90 degree angle, such as a rounded (not shown) or right chamfered corner (130). Similarly, a left chamfered corner (132) may form or construct the intersection of the forward side (128) with the left side (124) of the adjustment wedge (118). The adjustment wedge (118) may include a 90 degree (not shown) or non-90 degree angle corner, such as a chamfered (not shown) or right rounded corner (136), forming or constructing the intersection of the rear side (126) with the right side (122) and, similarly, a left rounded corner (134) forming or constructing the intersection of the rear side (126) with the left side (124). Similarly, the right corner (129) and left corner (131) of the AWP (116), may be rounded (as shown), or otherwise shaped to receive the adjustment wedge (118). Essentially parallel to the top side (120) of the adjustment wedge (118) is the bottom side (not shown).

An initial secured adjusted position of the cutting insert (104) may be obtained by means of a clamping wedge (144), and a clamping screw (146), which may be adapted to be inserted through an eccentrically located clamping screw bore (150) on the clamping wedge (144). The clamping wedge (144) may be fitted into a clamping wedge pocket (142), within the cutting tool body (102). The clamping wedge (144) may be an essentially inverted u-shaped element (148), with a non-planar front surface, such as a concave or convex curved front (152). A heel (154), connected to the base (156) of the clamping wedge (144), may be used to exert a braking force to the cutting insert (104) opposite to the axial direction (114A).

Figure 2:
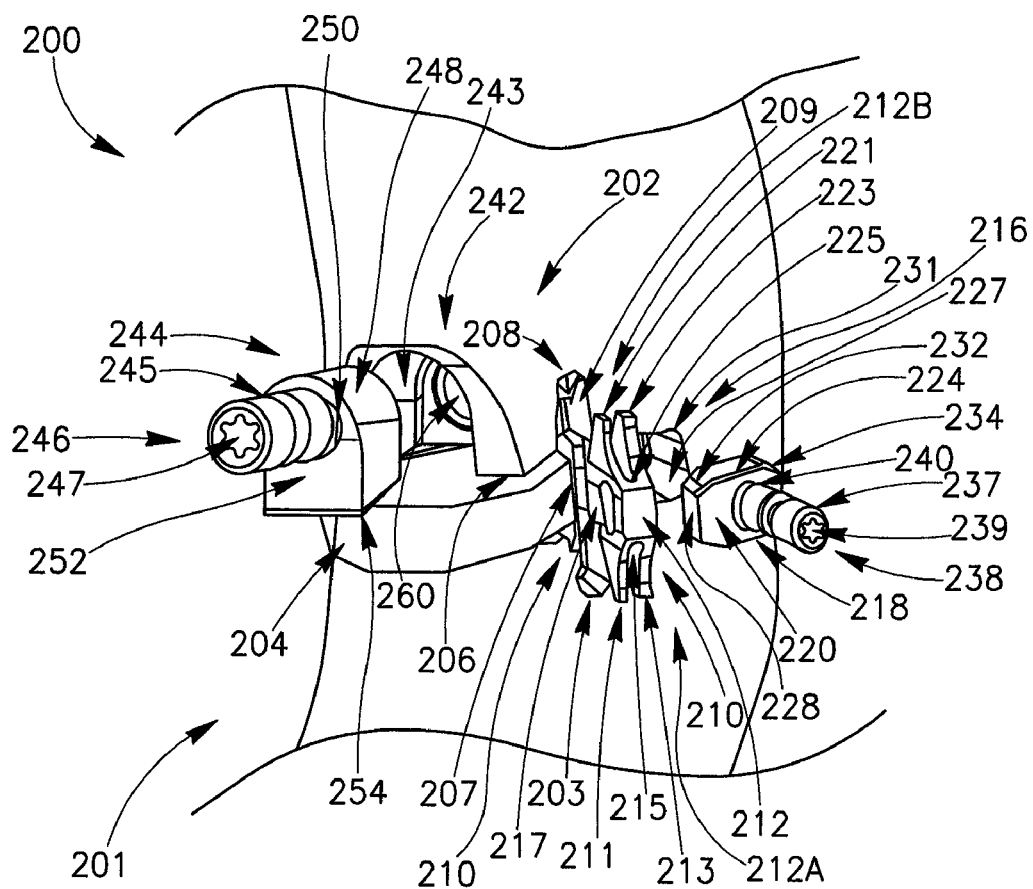
FIG. 2 shows an exploded, perspective, partial view of a cutting tool that includes a cutting insert adjustment device.

Reference is made to FIG. 2, which shows an exploded, perspective, partial view of a cutting tool (200), and a mounting configuration for the cutting insert adjustment device (201) within the cutting tool body (202). The cutting insert adjustment device (201) may include an adjustment wedge (218), which may be adapted to receive an adjustment screw (238), and a partially flexible intermediate member which may be a leaf spring (210). A cutting insert (204) may be positioned inside an insert pocket (206) within the cutting tool body (202). A portion of an insert side face (207) of the cutting insert (204), abuts with a portion of the outer wall (217) of the spring mid-section (212), of the leaf spring (210).

The leaf spring (210) may have essentially a cross-sectional form of the letter "H". The right extension (212A) of the leaf spring (210), may be formed by the parallel alignment of a right thin leaf (211) and a right thick leaf (213) connected through the spring mid-section (212). The left extension (212B) of the leaf spring (210), is essentially symmetrical to the right extension (212B) of the leaf spring (210). The left section (212B) may include a left thin leaf (221) and a left thick leaf (223). The leaf spring (210) may possibly, although not necessarily, be fitted under pressure into a leaf spring pocket (208), within the cutting tool body (202), for example, by pressing right thin leaf (211) and right thick leaf (213) together, and left thin leaf (221) and left thick leaf (223) together, respectively, prior to insertion into the leaf spring pocket (208). The leaf spring (210) may thus be structurally supported and/or secured at one or both ends (112A, 112B). Additionally, the leaf spring (210) may be asymmetric (not shown in cross section). Possibility or likelihood of fracture in the leaf spring (210) may be reduced by forming a right leaf rounded corner (215) at the connection of the right thin leaf (211) and right thick leaf (213) to the spring mid-section (212) of the leaf spring (210). Similarly, forming a left leaf rounded corner (225) at the connection of the left thin leaf (221) and left thick leaf (223) to the spring mid-section (212) of the leaf spring (210). When inserted, the right thick leaf (213) and the left thick leaf (223) may abut the inside pocket wall (209). Rounded edge (203) in the leaf spring pocket (208) may reduce the possibility or likelihood of fracture in that area of the cutting tool body (202) due to shock and vibration.

The adjustment wedge (218) may be a rectangularly shaped body with an eccentric threaded bore (240), which may be adapted to receive an adjustment screw (238), which may be inserted from the top side (220). The adjustment screw (238) may be a headless threaded shaft (237) with a torquing socket (239). Twisting motion of the adjustment screw (238) may drive the adjustment wedge (218) into the AWP, (216) within the cutting tool body (202). The intersection of the forward side (228) with the left side (224) of the adjustment wedge (218) may be a left chamfered corner (232). The left round corner (234) may border the left side (224) of the adjustment wedge (218) on the other end, and may serve to reduce the possibility or likelihood of fracture in the adjustment wedge (218). Similarly, left corner (231) of the inside wall (227) of the AWP (216), may be rounded. Essentially parallel to the top side (220) of the adjustment wedge (218) is the bottom side (not shown).

An initial secured position of the cutting insert (204) may be obtained by means of a clamping wedge (244), which may be fitted snugly against the interior wall (243) of a clamping wedge pocket (242), hereinafter referred to CWP (242), within the cutting tool body (202). A clamping screw (246), which may be a headless, threaded shaft (245) with a torquing socket (247) at one end, may be adapted to be inserted through an eccentric clamping screw bore (250) in the clamping wedge (244), and may be secured within a threaded socket (260) in the CWP (242). The clamping wedge (244) may be an essentially inverted unshaped element (248), with a non-planar front surface, such as a concave or convex curved front (252). A heel (254), connected to the base (256) of the clamping wedge (244), may be used to exert a braking force which may maintain the cutting insert (204) in place.

Figure 3:
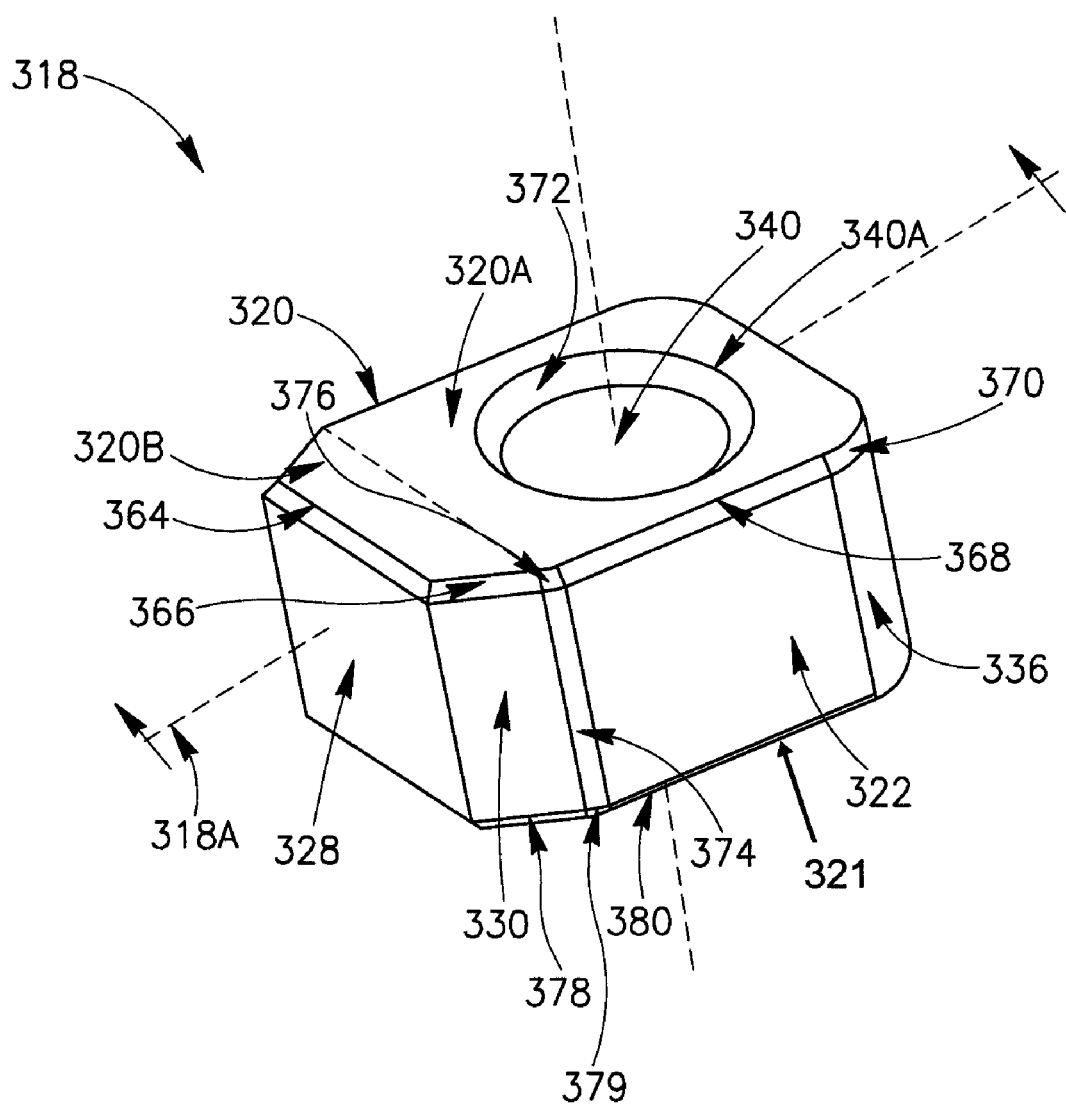
FIG. 3 shows an isometric drawing of an adjustment wedge.

Reference is made to FIG. 3, which is an isometric view of the adjustment wedge (318). The top side (320), may include a rectangular surface (320A) and an adjacent trapezoidal surface (320B) attached at one end. The sides of the trapezoidal surface (320B) may be angled at approximately 30 degrees with respect to a line parallel to the length of the rectangular surface (320A). The corners of the rectangular surface (320A) may be rounded at an angle of approximately 90 degrees, and radius approximately 2.1 mm. The adjustment wedge (318) may include a circular aperture (340A), which may have beveled edges (372) around the circumference of the circular aperture (340A), and may form an opening to a threaded bore (340). The circular aperture (340A) may have a radius of approximately 2.1 mm, and may be centered an approximate distance of 4.45 mm from the edge of the rear side (not shown) of the adjustment wedge (318). Essentially parallel to the top side (320) of the adjustment wedge (318) is the bottom side (321).

The right side (322) may be a rectangular surface and may lay perpendicular to the top side (320). The top-right-side-edge (368), hereinafter referred to as TRSE (368), may be a rectangular surface and may chamfer the intersection of the right side (322), with the top side (320). Located at the other end of the right side (322), may be the bottom-right-side-edge (380), hereinafter referred to as BRSE (380), which may be of similar characteristics as the TRSE (368).

The forward side (328), may be a rectangular surface, and may lie at an angle of approximately 5-20 degrees, for example 8 degrees, with respect to the center line (340B) of the threaded bore (340). The dimensions of the forward side (328) may be approximately 6 mm long, 5.5 mm wide. The top-forward edge (364) may be a rectangular surface and may chamfer the intersection of the forward side (328), with the top side (320).

The right chamfered corner (330), may be a rectangular surface and may chamfer the intersection of the forward side (328) with the right side (322), and may be at an angle of inclination of 20-60 degrees, for example 30 degrees, with respect to a parallel plane to the right side (322). The top-right-chamfer edge (366), hereinafter referred to as TRCE (366), may be a rectangular surface and may chamfer the intersection of the right chamfered corner (330) with the top side (320). Located at the other end of the right chamfered corner (330) may be the bottom-right-chamfer edge (378), hereinafter referred to as BRCE (378), which may be of similar characteristics as the TRCE (366).

The right-chamfer-side surface (374), hereinafter referred to RCSS (374), may lie between the right side (322) and the right chamfered corner (330), and may be an arcuate surface. The radius of the curvature of the RCSS (374) may be approximately 1 mm. The top-right-chamfer-side edge (376), hereinafter referred to as TRCSE (376), may be an arcuate surface, roundly beveling the intersection of the RCSS (374) with the top side (320). The radius of curvature of the TRCSE (376) may be approximately 1 mm. Located at the other end of the RCSS (374), may be the bottom-right chamfer-side edge (379), hereinafter referred to as BRCSE (379), which may be of similar characteristics as the top-right-chamfer-side edge (376), hereinafter referred to as TRCSE (376).

The right rounded corner (336) may be a 90 degrees arcuate surface and may be adjacent to the right side (322). The radius of curvature of the right rounded corner (336) may be approximately 2.1 mm. The top-right-corner edge (370), hereinafter referred to as TRCE (370), may be a 90 degrees arcuate surface and may chamfer the intersection of the right round corner (336) with the top side (320). The radius of curvature of the TRCE (370) may be approximately 2.1 mm.

The adjustment wedge (318) may be symmetrical about a plane of symmetry (318A) which may pass perpendicularly through the center of the front side (366) and may extend parallel to the right side (322) of the adjustment wedge (318).

Figure 4:
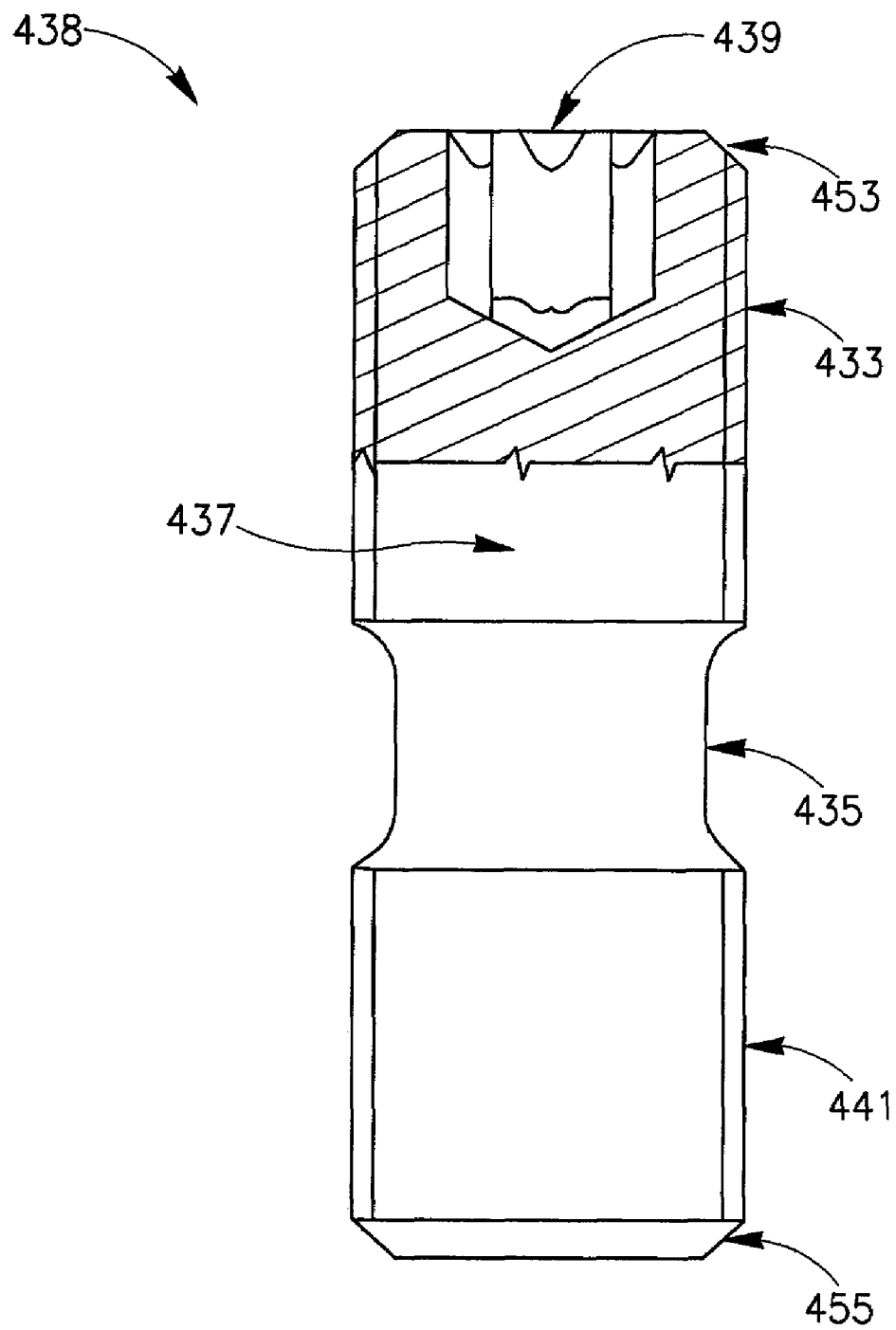
FIG. 4 shows a side, partial cross-sectional view of an adjustment wedge screw.
Figure 5:
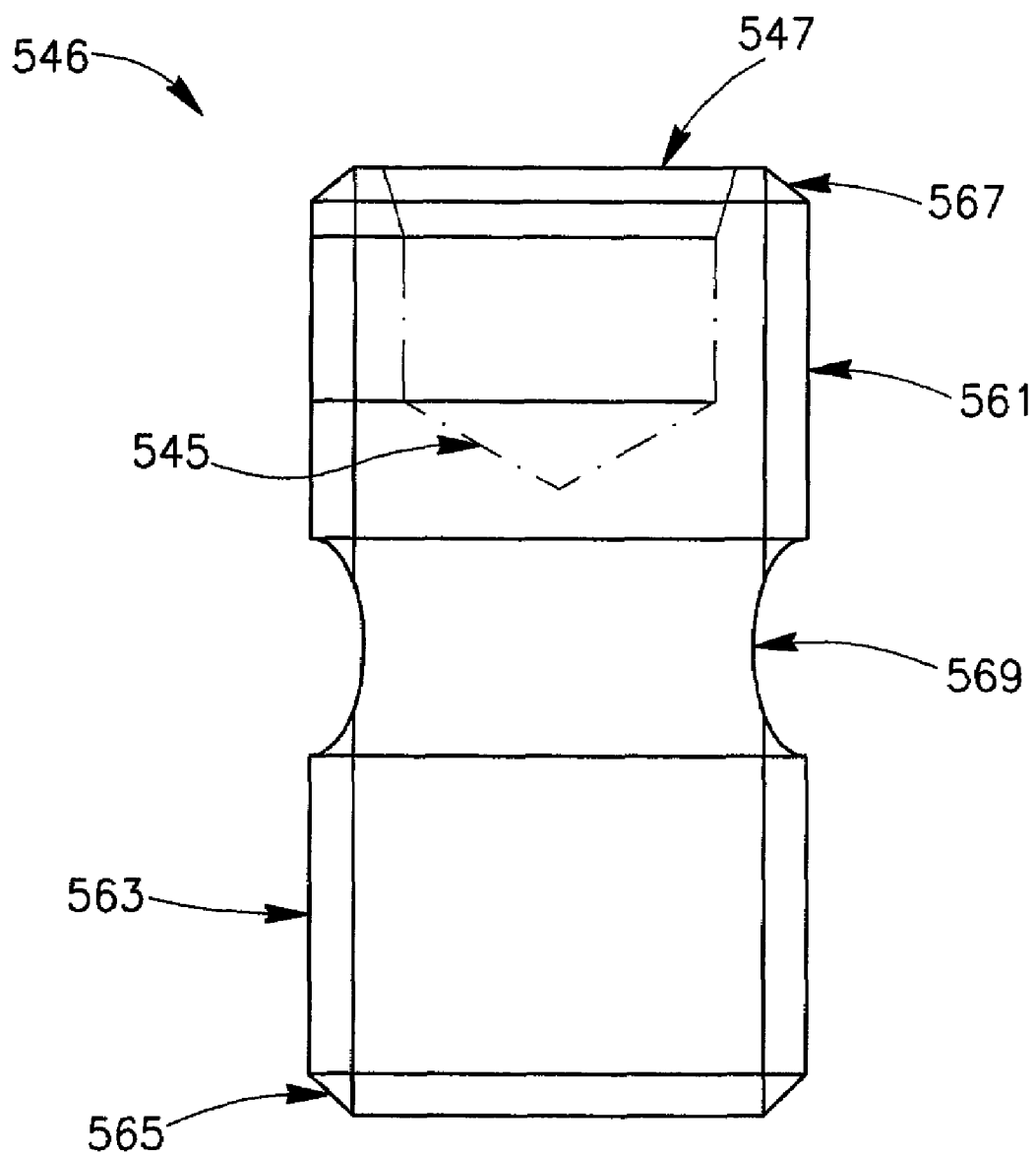
FIG. 5 shows a schematic side view of a clamp screw.
Figure 6A:
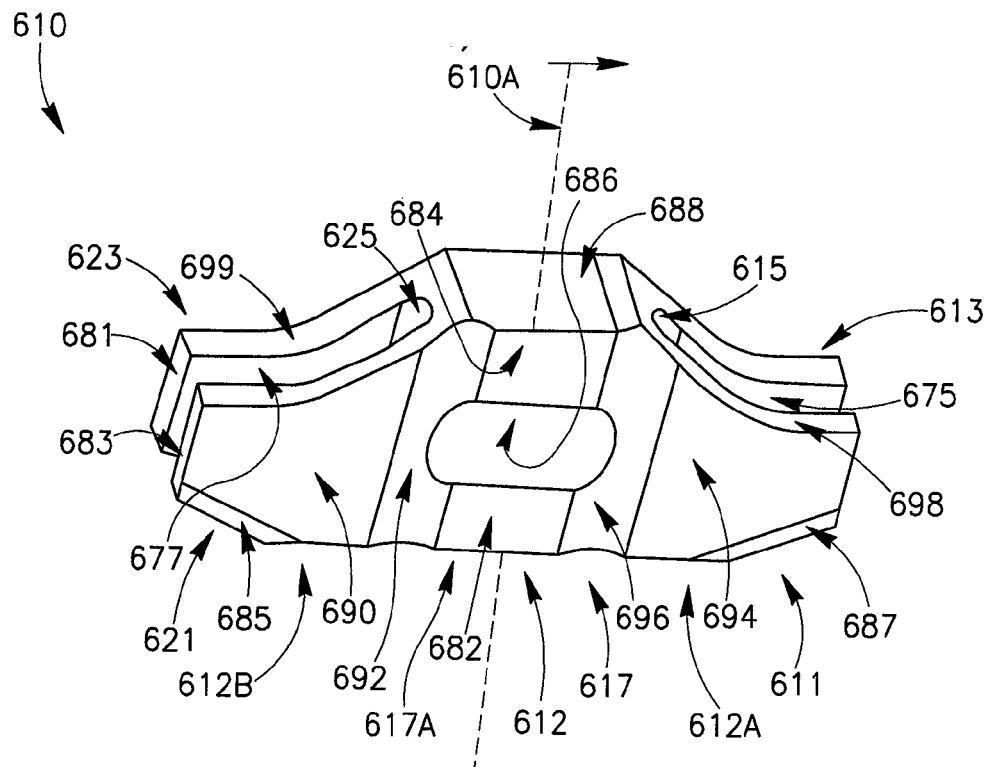
FIG. 6A shows an isometric view of a front side of a leaf spring.
Figure 6B:
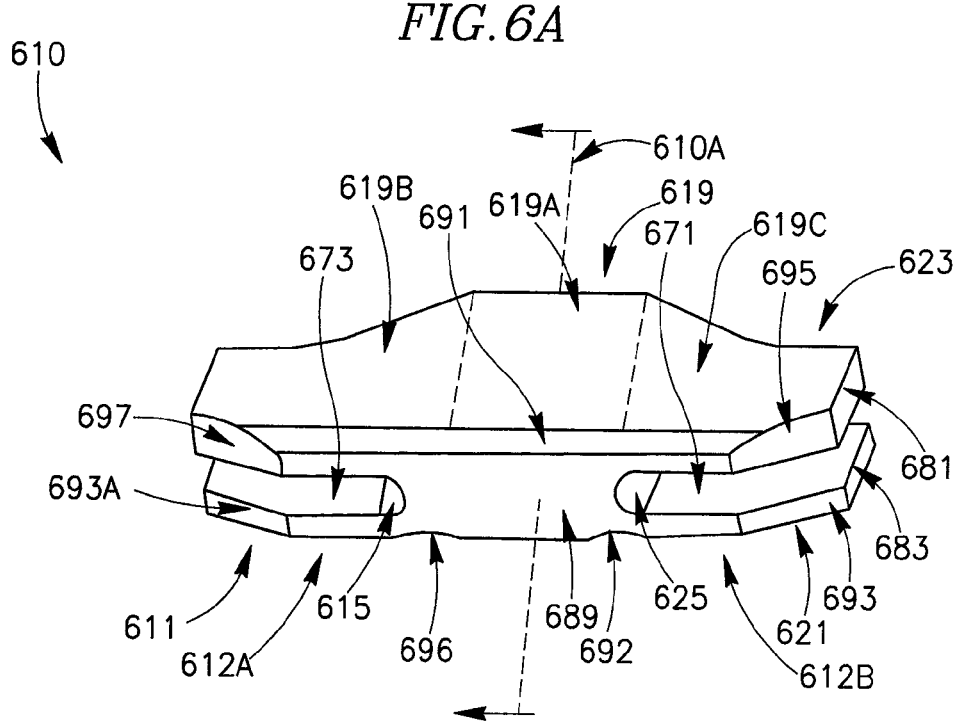
FIG. 6B shows an isometric view of a backside of a leaf spring.

Reference is made to FIG. 4, a partial cross-section, side view of the wedge adjustment screw (438), which may be a headless, right-left handed threaded shaft (437) and which may include an upper section (433), a middle section (435) and a lower section (441). The top of the upper section (433) may include a torquing socket (439) and an upper chamfer (453) along the circumference of the upper section (433). The bottom of the lower section (441) may have a lower chamfer (455) along the circumference, which may be of similar characteristics as the upper chamfer (453). The upper section (433) may be of a length of approximately 6.5 mm and a diameter of approximately 5 mm. The middle section (435) may be of a length of approximately 4 mm and diameter of approximately 4 mm. The lower section (441) may be of a length of approximately 5 mm and diameter of approximately 5 mm. The upper chamfer (453) of the upper section (433) and the lower chamfer (455) of the lower section (441), respectively, may be angled at approximately 45 degrees may have an approximate height of 0.5 mm Reference is made to FIG. 5, a partial cross-section, side view of the clamping screw (546), which may be a headless, right-left handed threaded shaft (545), and which may include an upper section (561), a middle section (569), and a lower section (563). The top of the upper section (561) may include a torquing socket (547) and an upper chamfer (567) along the circumference of the upper section (561). The end of the lower section (563), may have a lower chamfer (565) along the circumference, and may be of similar characteristics as the upper chamfer (567). The upper section (561) may be of a length of approximately 5 mm and a diameter of approximately 6 mm. The middle section (569) may be of a length of approximately 5 mm and diameter of approximately 3 mm. The lower section (563) may be of a length of approximately 5 mm and diameter of approximately 6 mm. The upper chamfer (567) of the upper section (561) and the lower chamfer (565) of the lower section (563), respectively, may be angled at approximately 45 degrees may have an approximate height of 0.5 mm Reference is made to FIG. 6A and FIG. 6B which are isometric drawings of the leaf spring (610). The leaf spring (610), may include a centrally located spring mid-section (612), a right extension (612A), which may include a right thin leaf (611) and a right thick leaf (613), and a left extension (612B) which may include a left thin leaf (621) and a left thick leaf (623). Both the right extension (612A) and the left extension (612B) may be symmetrical to one another about the plane of symmetry (610A) of the leaf spring (610). The leaf spring (610) may exhibit a degree of elasticity when the right extension (612A) and the left extension (612B) are supported.

An outer wall (617) may cover the exterior surface of the leaf spring (610), which may extend from the far edge of the right thin leaf (611) to the far edge of the left thin leaf (621). An inner wall (619), which may be parallel to the outer wall (617) of the leaf spring (610), may cover the exterior surface of the leaf spring (610) opposite to the outer wall (617), and may extend from the far edge of the right thick leaf (613) to the far edge of the left thick leaf (623).

The spring mid-section (612), which may include a wall section (617A) of the outer wall (617), may include a top surface (684) and a bottom surface (682). The dimensional thickness of the spring mid-section (612) may be approximately 3.2 mm. The dimensions of the top surface (684) and the bottom surface (682), respectively, may be approximately 3.2 mm in length and 2.25 in width. Located between the top surface (684) and the bottom surface (682), may be an elliptical-shaped surface (686). The dimensions of the elliptical-shaped surface (686) may be approximately 4.9 mm in length and 3 mm in width. A right boundary of the spring mid-section (612), may be defined by a right circumferential groove (696). The right circumferential groove (696) may have a radius of curvature of approximately 2 mm and a height of approximately 0.2 mm. A left boundary of the spring mid-section (612) may similarly be defined by a left circumferential groove (692), and may have similar characteristics to the right circumferential groove (696). On the opposite side of the spring mid-section (612), parallel to the wall section (617A) of the outer wall (617), may be a middle wall section (619A) of the inner wall (619). A mid-section top surface (688) and a mid-section bottom surface (689) may perpendicularly intersect the middle wall section (619A) of the inner wall (619), to form sides.

The right thin leaf (611), may be integrally connected to the spring mid-section (612). One side of the right thin leaf (611) may include a right outer surface (694), which may have as a left boundary the right circumferential groove (696), and may have as a right boundary the right edge of the leaf spring (610). The opposite side of the right thin leaf (611) may include a right inner surface (673), and may be parallel to the right outer surface (694) of the right thin leaf (611). A right top surface (698) and a right bottom surface (693A) may form the sides of the right thin leaf (611), by perpendicularly intersecting the right inner surface (673), and the right outer surface (694) of the right thin leaf (611). The right top surface (698), may be diagonally slanted at an angle relative to the mid-section top surface (688), and may be subsequently curved, until intersecting the edge of the leaf spring (610). The right bottom surface (693A) may be diagonally slanted at an angle relative to the mid-section bottom surface (689) until intersecting the edge of the leaf spring. The right outer surface (694) may have a right chamfered edge (687). The dimensional thickness of the right thin leaf (611) may be approximately 0.75 mm. The angle of slanting and the subsequent radius of curvature forming the shape of the right top surface (698) may be approximately 40 degrees and 4 mm, respectively. The angle of slanting of the right bottom surface (693A) may be approximately 27.5 degrees. The width of the right thin leaf (611) at the far edge may be approximately 3.5 mm. The right chamfered edge (687) may be angled at approximately 10 degrees and may have an approximate height of 0.6 mm.

The left thin leaf (621), may be integrally connected to the leaf spring mid-section (612). One side of the left thin leaf (621) may include a left outer surface (690), which may have as a right boundary the left circumferential groove (692), and may have as a left boundary the left edge of the leaf spring (610). The opposite side of the left thin leaf (621) may include a left inner surface (671), and may be parallel to the left outer surface (690) of the left thin leaf (621). A left top surface (699), a left bottom surface (693), and a left edge surface (683) may form the sides of the left thin leaf (621) by perpendicularly intersecting the left inner surface (671), and the left outer surface (690) of the left thin leaf (621). The left top surface (699), may be diagonally slanted at an angle relative to the mid-section top surface (688), and may be subsequently curved until intersecting the edge surface (683) of the left thin leaf (621). The thin leaf bottom surface (693) may be diagonally slanted at an angle relative to the mid-section bottom surface (689), until intersecting the edge surface (683) of the left thin leaf (621). The left outer surface (690) may have a left chamfered edge (685). The dimensional characteristics of the left thin leaf (621), including that of its elements and/or components, may be similar to that of the right thin leaf (611).

The right thick leaf (613), may be integrally connected to the spring mid-section (612). One side of the right thick leaf (613) may include a right wall section (619B) of the inner wall (619). The opposite side of the right thick leaf (613) may include a right inner surface (675) and may be parallel to right wall section (619B) of the inner wall (619). The right top surface (698) of the leaf spring (610), and a right thick leaf bottom surface (697), may form the sides of the right thick leaf (613), by perpendicularly intersecting the right inner surface (675) and the right wall section (619B). The right top surface (698), may be diagonally slanted at angle relative to the mid-section top surface (688), and may be subsequently curved until intersecting the edge of the leaf spring (610). The right thick leaf bottom surface (697), may be diagonally slanted at an angle relative to the mid-section bottom surface (689), until intersecting the edge of the leaf spring (610). The dimensional thickness of the right thick leaf (613) may be approximately 1.25 mm. The angle of slanting and the subsequent radius of curvature forming the shape of the right top surface (698) may be approximately 40 degrees and 4 mm, respectively. The angle of slanting of the right thick leaf bottom surface (697) may be approximately 27.5 degrees. The width of the right thick leaf (613) at the far edge may be approximately 3.5 mm.

The left thick leaf (623), may be integrally connected to the spring mid-section (612). One side of the left thick leaf (623) may include a left wall section (619C) of the inner wall (619). The opposite side of the left thick leaf (623) may include a left inner surface (677) and may be parallel to left wall section (619C) of the inner wall (619). The left top surface (699) of the leaf spring (610), and a left thick leaf bottom surface (695), may form the sides of the left thick leaf (623), by perpendicularly intersecting the left inner surface (677) and the left wall section (619C). The left top surface (699), may be diagonally slanted at angle relative to the mid-section top surface (688), and may be subsequently be curved until intersecting the edge surface (681) of the left thick leaf (623). The left thick leaf bottom surface (695) may be diagonally slanted at an angle relative to the mid-section bottom surface (689), until intersecting the edge surface (681) of the left thick leaf (623). The dimensional characteristics of the left thick leaf (623), including that of its elements and/or components, may be similar to that of the right thick leaf (613).

The leaf spring (610) may include a right leaf rounded corner (615) at the connection of the right thin leaf (611) and the right thick leaf (613) to the spring mid-section (612), which may reduce the possibility or likelihood of fracture. Similarly, the leaf spring (610) may include a left leaf rounded corner (625) at the connection of the left thin leaf (621) and the left thick leaf (623) to the spring mid-section (612). A chamfer edge (691) may extend along a major length of the intersection of the inner wall (619) with the mid-section bottom surface (689). The chamfer edge (691) may be angled at approximately 45 degrees and may have a height of width of approximately 0.5 mm.

Figure 7:
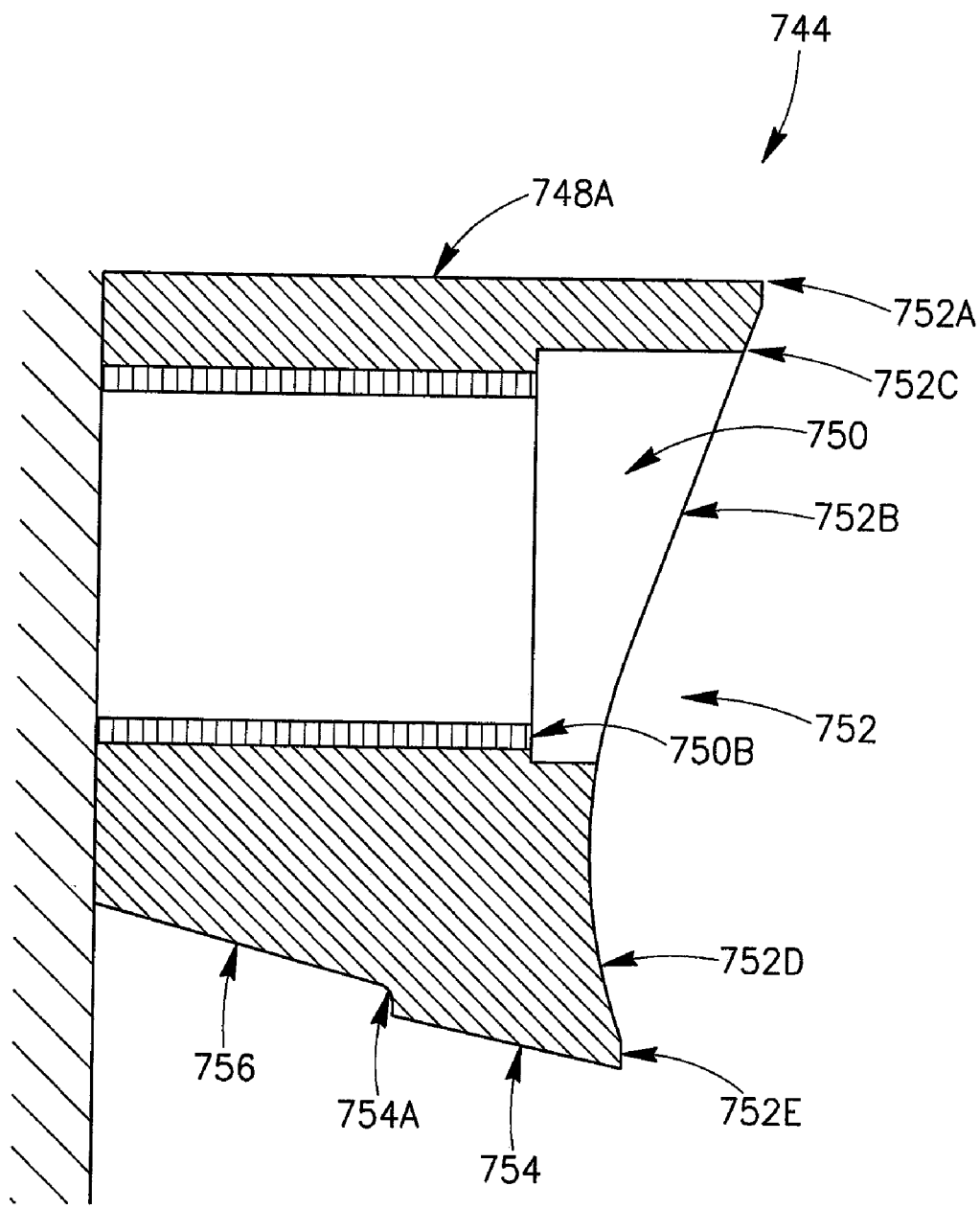
FIG. 7 shows a cross-sectional, side view of a clamping wedge.

Reference is made to FIG. 7 which illustrates a cross-sectional side view of the clamping wedge (744). The clamping wedge (744) may be an inverted u-shaped element (748) which may include a clamping screw bore (750), which may extend the length of the clamping wedge (744). Left-hand threads (750B) may run down the length of the clamping screw bore (750). The length of the u-shaped element (748) may be approximately 10 mm. The clamping screw bore (750) may have a diameter of approximately 6.5 mm and may be positioned so that the center is approximately 5 mm from the top surface (748A) of the clamping wedge (744). The left-hand threads (750B) may start approximately 3.5 mm into the clamping screw bore (750), and there may be 28 threads per inch.

A front surface (752) may be an integral portion of the u-shaped element (748). An upper lip section (752A), may be perpendicular to a rounded top surface (748A), and may extend in the direction of a clamping screw bore opening (752B), hereinafter referred to CSBO. The width of the upper lip section (754A) may be approximately 0.4 mm. Adjacently below may be an upper chamfered edge (752C), which may trace the circumference of the CSBO (752B). The upper chamfered edge (752C) may be oriented at an angle of approximately 20 degrees in the direction of the center of the CSBO (752B). The bottom edge of the CSBO (752B), borders a lower front surface (752D). The lower front surface (752D) may be concavely-shaped and terminated in a lower chamfered edge (752E). The width of the lower chamfer edge (752E) may be approximately 0.3 mm.

The base (756) may be an integral part of the u-shaped element (748). The forward section of the base (756) may include a heel (754), forwardly inclined at an angle relative to the lower chamfered edge (752E). The thickness of the base (756) may be tapered towards the rear of the clamping wedge (744), as the distance from the lower front surface (752D) increases. So as to reduce the possibility of fracture in the base (756) due to shock and vibration, a 90 degrees rounded heel corner (754A) may be included. The heel (754) may have a width of approximately 3.6 mm and may be inclined at an angle of approximately 103 degrees. The radius of curvature of the rounded heel corner may be approximately 0.4 mm. The thickness of the base (756) at the tapered end may be approximately 1.75 mm, the angle of tapering approximately 106.7 degrees relative to a vertical axis.

Figure 8:
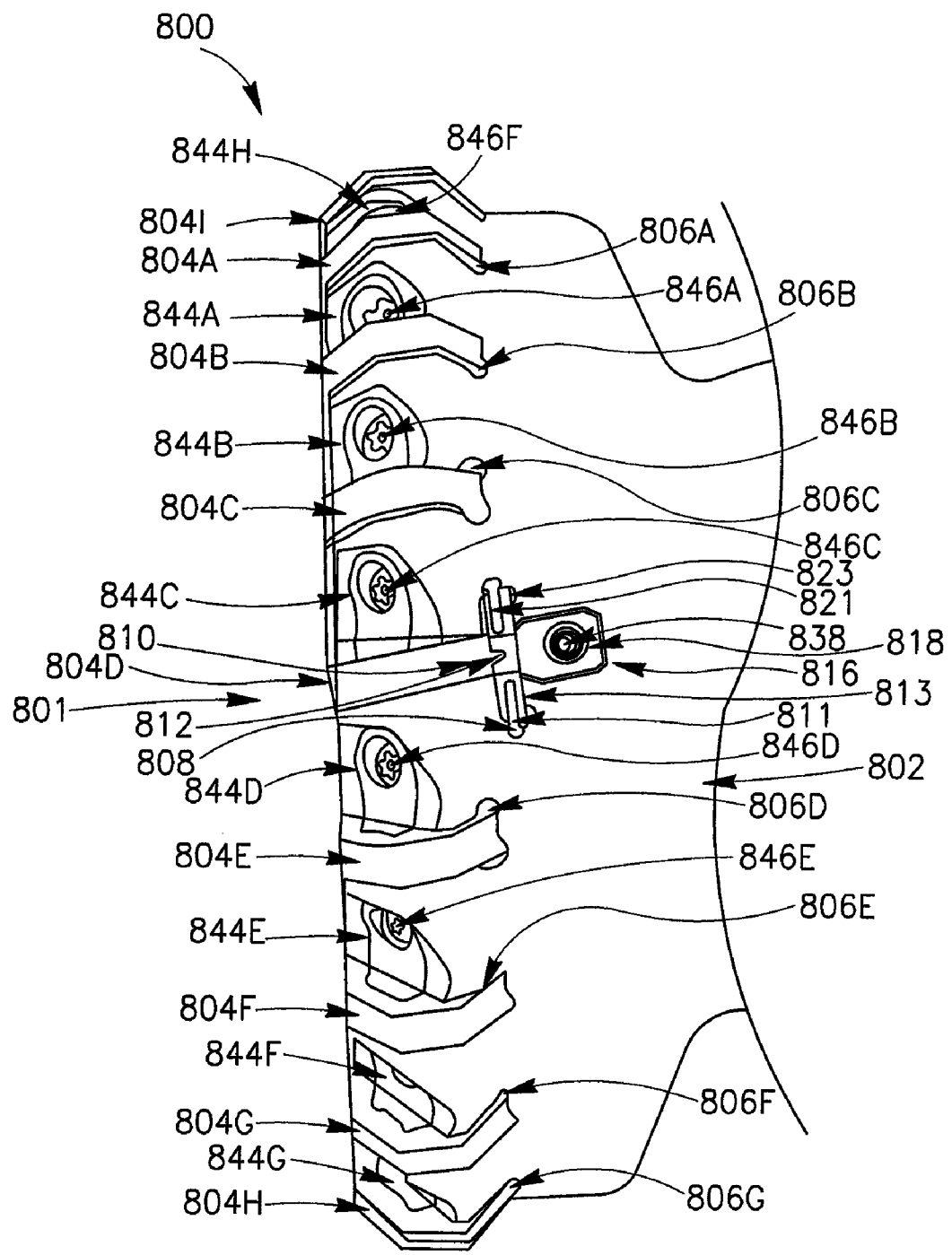
FIG. 8 shows a side view of a cutting tool.

Reference is made to FIG. 8 which shows a side view of the cutting tool (800). The cutting tool body (802), may be circumferentially fitted with a plurality of cutting inserts (804A-804I). The cutting inserts (804A-804I) may be individually accommodated in a semi-recessed position inside an insert pocket (806A-806G) and, after fine adjustment, may be secured in position by a clamping wedge (844A-844H). One or more cutting inserts may be adapted with a cutting insert adjustment device (801).

The cutting insert adjustment device (801), may include a leaf spring (810), an adjustment wedge (818), an adjustment screw (838), the clamping wedge (844C), and a clamping screw (846C).

The leaf spring (810), may be physically located between the cutting insert (804D) and the adjustment wedge (818), and may be positioned inside a leaf spring pocket (808). The leaf spring (810), may include a spring mid-section (812), through which are connected a right thin leaf (811), a right thick leaf (813), a left thin leaf (821), and a left thick leaf (823).

The adjustment wedge (818), may be a rectangular-shaped body adapted to receive an adjustment screw (838). Rotational motion of the wedge adjustment screw (838) may drive the adjustment wedge (818) into the AWP (816).

The adjusted position of the cutting insert (804D), may be secured by the clamping wedge (844C), through which the clamping screw (846C), may be inserted.

Figure 9A:
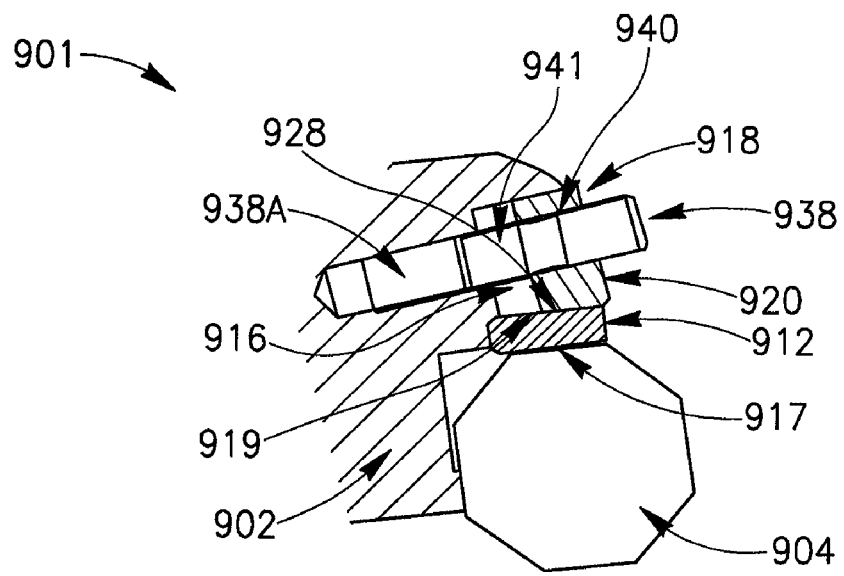
FIG. 9A shows a cross-sectional view of a wedge-leaf spring mechanism prior to adjustment of a cutting insert.
Figure 9B:
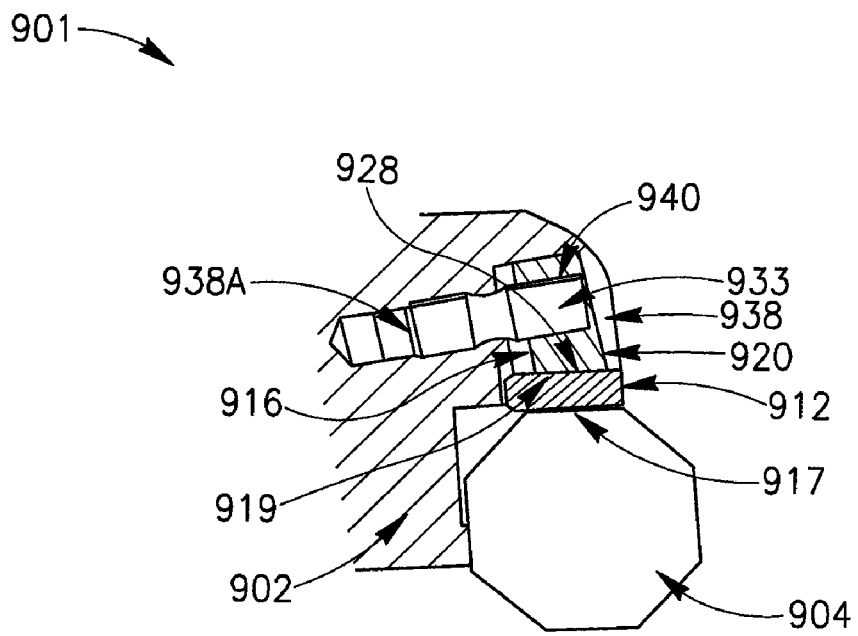
FIG. 9B shows a cross-sectional view of a wedge-leaf spring mechanism after adjustment of a cutting insert.

The mechanism of the operation is illustrated in FIG. 9A and FIG. 9B, and FIGS. 10A and 10B. Reference is made to FIG. 9A and FIG. 9B, a cross-sectional view of the cutting insert adjustment device (901), illustrating a possible configuration prior to adjustment of the cutting insert (904) and following adjustment, respectively.

Prior to adjustment of the cutting insert (904), the adjustment wedge (918) may be partially inserted into the AWP (916), the orientation such that the top side (920) of the adjustment wedge (918) may be facing away from the cutting tool body (902), and the forward side (928) of the adjustment wedge (918) may abut with the inner wall (919) of the leaf spring (910). The adjustment screw (938), may be inserted from the top side (920) of the adjustment wedge (918), into the threaded bore (940) of the adjustment wedge (918), until the lower section (941) of the wedge adjustment screw (938) may be partially threaded inside the wedge threaded socket (938A) in the cutting tool body (902).

Adjustment of the cutting insert (904) may then be performed by tightening the wedge adjustment screw (938) further into the threaded bore (940) of the adjustment wedge (918). The orientation of the threading in the threaded bore (940), the adjustment screw (938), and the wedge threaded socket (938A), respectively, may be such that the tightening action of the adjustment screw (928) forces the adjustment wedge (918) to advance further into the AWP (916). This may be evidenced by the position of the adjusting screw upper section (933) within the adjustment wedge (918) prior to adjustment and following adjustment. Due to clearance restrictions which may be imposed by the dimensions of the AWP (916), the forward side (928) of the adjustment wedge (918), may push into the middle wall section (919A) in the spring mid-section (912) of the leaf spring (910). This action may cause a deformation in the wall section (917A) of outer wall (917) of the leaf spring (910), which in turn may impart linear force on the cutting insert (904), and may cause the cutting insert (904) to undergo a displacement in axial direction (914A) away from the cutting tool body (902). The extent of the deformation in the wall section (917A) of the outer wall (917) of the leaf spring (910), may be directly related to the position of the adjustment wedge (918) inside the AWP (916).

Figure 10A:
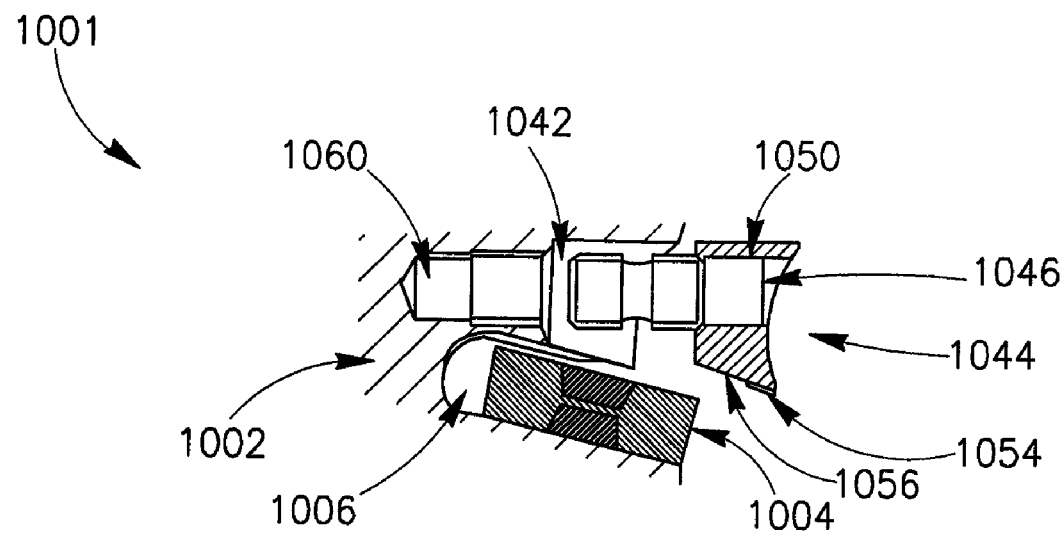
FIG. 10A shows a cross-sectional view of a clamping wedge mechanism prior to clamping of a cutting insert; and, FIG. 10B shows a cross-sectional view of a clamping wedge mechanism after clamping of a cutting insert.
Figure 10B:
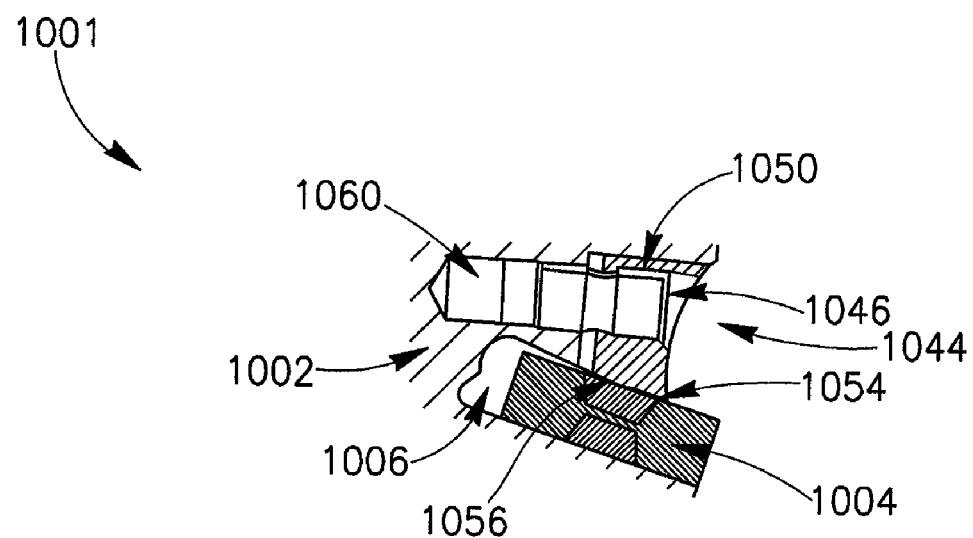

Reference is made to FIG. 10A and FIG. 10B, a cross-sectional view of the cutting insert adjustment device (1001), illustrating a possible configuration prior to clamping of the cutting insert (1004) and following clamping, respectively. Once the position of the cutting insert (1004) has been adjusted inside the insert pocket (1006), locking in place of the cutting insert (1004) may be achieved by means of a heel (1054) on the base (1056) of the clamping wedge (1044), which may be responsible for the exertion of a braking force in the direction opposite to that of the axial direction (1014A). Initially, the clamping wedge (1044), may be fitted into the clamping wedge pocket (1042), and may be secured in place, by inserting the clamping screw (1046) through the clamping screw bore (1050) and into the threaded socket (1060). Final clamping, or locking, may be performed, once the cutting insert (1004) is adjusted in the final position within the insert pocket (1006), by tightening the clamping screw (1046) further into the clamping screw bore (1050) and clamping screw socket (1060). The orientation of the threading in the clamping screw bore (1050), the clamping screw (1046), and the threaded socket (1060), may be such that the action of tightening the clamping screw (1046) forces the clamping wedge (1044) to advance further into the CWP (1042).

Similar devices and methods are hereby explicitly contemplated which would use a left-hand, right-hand (or other, such as reciprocating) repetitive contacting of a portion of an insert to a surface of a material to be shaped.

The foregoing description of various embodiments of the present disclosure has been presented for the purposes of illustration and description. It is not intended to be exhaustive or to limit the present disclosure to the precise form disclosed. It should be appreciated by persons skilled in the art that many modifications, variations, substitutions, changes, and equivalents are possible in light of the above teachings. It is therefore intended that the appended claims and claims hereafter introduced be interpreted to include all modifications, permutations, additions and sub-combinations as are within their true spirit and scope.

What is claimed is:

1. A cutting insert adjustment device for a cutting tool, comprising:
    an adjustment screw;
    an adjustment wedge adapted to receive said screw, wherein a position of said wedge is a function of the rotation of said screw, when said adjustment wedge is operatively connected to a cutting insert; and
    a partially flexible intermediate member having first and second ends, between a surface of said wedge and a surface of the cutting insert, wherein said intermediate member is supported on both ends;
    wherein:
    the partially flexible intermediate member comprises a leaf spring having a centrally located leaf spring mid-section and at least one leaf extending on either side of the mid-section;
    a forward side of the adjustment wedge abuts an inner wall of the mid-section; and
    a portion of an insert side face of the cutting insert abuts an outer wall of the mid-section.

2. The device according to claim 1, wherein said leaf spring comprises two essentially parallel leaves connected to each other by the mid-section.

3. The device according to claim 2, wherein one of said two essentially parallel leaves is thicker than the other.

4. The device according to claim 1, wherein said flexible intermediate member is adapted to transmit force applied by said wedge in the axial direction thereby to adjust the location of the insert.

5. The device according to claim 1, wherein said adjustment wedge comprises a top side and an essentially parallel bottom side, each comprising a trapezoidal surface.

6. The device according to claim 5, wherein said adjustment wedge further comprises a forward side wherein said forward side is disposed at an acute angle with respect to said top side.

7. The device according to claim 5, wherein said forward side is disposed at an obtuse angle with respect to said bottom side.

8. The device according to claim 1, wherein the direction of advancing of the screw is essentially parallel to the direction of advancing of said adjustment wedge.

9. The device according to claim 1, further comprising a clamping wedge adapted to secure the cutting insert to a cutting tool.

10. The device according to claim 9, wherein said clamping wedge is adapted to receive a clamping screw, which is adapted to control the position of said cutting insert.

11. The device according to claim 9, wherein said clamping wedge is located essentially perpendicularly to the cutting insert.

12. A cutting tool having at least one removable cutting insert adjustment device installed therein, wherein said cutting insert adjustment device comprises:
- an adjustment screw;
- an adjustment wedge having said screw received therein, wherein a position of said wedge, relative to said cutting tool, is a function of the rotation of said screw; and
- a partially flexible intermediate member having first and second ends, the intermediate member being interposed between a surface of said wedge and a surface of the cutting insert, wherein said intermediate member is supported at both ends;

wherein:
- the partially flexible intermediate member comprises a leaf spring having a centrally located leaf spring mid-section and at least one leaf extending on either side of the mid-section;
- a forward side of the adjustment wedge abuts an inner wall of the mid-section; and
- a portion of an insert side face of the cutting insert abuts an outer wall of the mid-section.

13. The device according to claim 12, wherein said leaf spring comprises two essentially parallel leaves connected to each other by the mid-section.

14. The tool according to claim 13, wherein one of said two essentially parallel leaves is thicker than the other.

15. The tool according to claim 12, wherein said flexible intermediate member is adapted to transmit force applied by said wedge in an axial direction of the cutting tool, to thereby adjust a position of the insert.

16. The tool according to claim 12, wherein said adjustment wedge comprises a top side and an essentially parallel bottom side, each comprising a trapezoidal surface.

17. The tool according to claim 16, wherein said adjustment wedge further comprises a forward side wherein said forward side is disposed at an acute angle with respect to said top side.

18. The tool according to claim 16, wherein said forward side is disposed at an obtuse angle with respect to said bottom side.

19. The tool according to claim 12, wherein a direction of advancing of the screw is essentially parallel to the direction of advancing of said adjustment wedge.

20. The tool according to claim 12, further comprising a clamping wedge adapted to secure the cutting insert to the cutting tool.

21. The tool according to claim 20, wherein said clamping wedge is adapted to receive a clamping screw, the clamping wedge and clamping screw cooperating to control the position of said cutting insert.

22. The tool according to claim 20, wherein said clamping wedge is located essentially perpendicularly to the cutting insert.

23. The tool according to claim 12, wherein said tool is a milling tool.

24. The tool according to claim 12, wherein said tool comprises two or more devices for adjusting a position of a cutting insert.

25. A method of adjusting the position of a cutting insert in a cutting tool, the method comprising:
- initially securing a cutting insert to a cutting tool;
- positioning, in the cutting tool, a leaf spring comprising a centrally located leaf spring mid-section and at least one leaf extending on either side of the mid-section;
- adjusting the position of said cutting insert by rotating an adjustment screw located in an adjustment wedge, whereby a forward side of said adjustment wedge applies an axial force on an inner wall of the mid-section and an outer wall of the centrally located mid-section transmits the force applied by said adjustment wedge in the axial direction to said cutting insert; and
- clamping said cutting insert.

26. The device according to claim 1, wherein the direction of advancing of the screw is essentially parallel to the direction of advancing of said adjustment wedge and said cutting insert.

27. The tool according to claim 12, wherein a direction of advancing of the screw is essentially parallel to the direction of advancing of said adjustment wedge and said cutting insert.

* * * * *